United States Patent
Hung et al.

(10) Patent No.: US 10,057,567 B2
(45) Date of Patent: Aug. 21, 2018

(54) METHOD AND APPARATUS FOR VIDEO ENCODING

(71) Applicant: MStar Semiconductor, Inc., Hsinchu Hsien (TW)

(72) Inventors: Wei-Hsiang Hung, Taipei (TW); Chia-Chiang Ho, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 672 days.

(21) Appl. No.: 13/716,312

(22) Filed: Dec. 17, 2012

(65) Prior Publication Data

US 2013/0301726 A1    Nov. 14, 2013

(30) Foreign Application Priority Data

May 11, 2012   (TW) .............................. 101116943 A

(51) Int. Cl.
| | | |
|---|---|---|
| H04N 7/12 | (2006.01) | |
| H04N 11/02 | (2006.01) | |
| H04N 11/04 | (2006.01) | |
| H04N 19/51 | (2014.01) | |
| H04N 19/433 | (2014.01) | |

(52) U.S. Cl.
CPC ..... *H04N 19/00587* (2013.01); *H04N 19/433* (2014.11)

(58) Field of Classification Search
CPC ........................... H04N 19/433; H04N 19/423
See application file for complete search history.

(56) References Cited

U.S. PATENT DOCUMENTS

| | | | | |
|---|---|---|---|---|
| 6,421,466 | B1* | 7/2002 | Lin ...................... | H04N 19/186 375/240.11 |
| 2007/0217756 | A1* | 9/2007 | Lee et al. .......................... | 386/46 |
| 2008/0089426 | A1* | 4/2008 | Wang ....................... | 375/240.24 |
| 2008/0205858 | A1* | 8/2008 | Lee et al. ....................... | 386/124 |
| 2009/0110054 | A1* | 4/2009 | Kim ..................... | H04N 19/647 375/240.1 |
| 2009/0316041 | A1* | 12/2009 | Pearlstein ................ | H04N 5/91 348/390.1 |
| 2011/0064137 | A1* | 3/2011 | Han et al. ................. | 375/240.14 |
| 2011/0102447 | A1* | 5/2011 | Lin ......................... | H04N 7/012 345/570 |
| 2013/0236163 | A1* | 9/2013 | Hellman ............... | H04N 19/186 386/326 |

FOREIGN PATENT DOCUMENTS

| | | |
|---|---|---|
| CN | 101043595 | 9/2007 |
| TW | 200818900 A | 4/2008 |
| TW | 201216201 A | 4/2012 |

OTHER PUBLICATIONS

Taiwan Intellectual Property Office, "Office Action", dated Dec. 25, 2014.
China Patent Office, "Office Action," dated Aug. 25, 2015.

\* cited by examiner

*Primary Examiner* — Jorge L Ortiz Criado
*Assistant Examiner* — Boubacar Abdou Tchoussou
(74) *Attorney, Agent, or Firm* — WPAT, PC

(57) ABSTRACT

A method for video decoding includes: dividing a plurality of luma component data of a reference frame into a plurality of primary data and a plurality of secondary data, respectively stored in a first memory region and a second memory region; accessing the first memory region to perform a motion estimation; and accessing the second region to perform a luma motion compensation.

16 Claims, 8 Drawing Sheets

METHOD AND APPARATUS FOR VIDEO ENCODING

This application claims the benefit of Taiwan application Serial No. 101116943, filed May 11, 2012, the subject matter of which is incorporated herein by reference.

BACKGROUND OF THE INVENTION

Field of the Invention

The invention relates in general to a video decoding method and associated apparatus, and more particularly, to a video decoding method and associated apparatus capable of reducing a buffer bandwidth requirement for enhancing performance in video decoders.

Description of the Related Art

Being capable of transmitting and recording diversified audiovisual messages, image data and video encoding techniques thereof have become indispensable constituents in the modern information society. To reduce a file size of image data, the image data must be encoded. Encoding requires memory for storage and processing power for the actual encoding. Thus, the optimization of video encoding performance has come into the spotlight in research and development of information developers in an attempt to increase efficiency during the process of encoding.

Image data are formed by a plurality of serial frames. Each of the frames includes a plurality of pixels, each associated with three component data, e.g., a luma component and two chroma component data in a YUV color space. When video encoding original image data, the frames of the original image data are separately yet pertinently encoded. For example, a frame is encoded to an intra-coded frame (I-frame), a predicted frame (P-frame), or a bidirectional predicted frame (B-frame).

To encode a current frame into a P-frame or a B-frame, one or more reference frames are cited. A situation of citing one reference frame is described as follows. Corresponding to a reference frame, a current frame is divided into a plurality of blocks (e.g., 16*16 macro blocks), each associated with a search window in the reference frame. Each search frame covers a corresponding block and a plurality of neighboring pixels of a peripheral region in the reference frame. When video encoding a current block of the current frame, the luma component data of the current block is compared with the luma component data of the corresponding search window to perform a luma motion estimation to obtain a luma motion vector. According to the luma motion vector as well as the luma component data and the two chroma component data of each pixel in the search window, a motion compensation, including a luma compensation and a chroma compensation, can be performed to obtain a similar block, which is similar to the current block. A residual block is obtained by subtracting the similar block from the current block, and the residual block is further compressed. The compressed residual block and the motion vector constitute an encoding result, for representing the current block. A situation of citing a plurality of reference frames can be deduced similarly.

From perspectives of video decoding, when video decoding an encoded current frame, by referring to motion vectors corresponding to blocks in a reference frame and the current frame, corresponding similar blocks can be obtained for each of the blocks of the current frame. An original (unencoded) frame can be reconstructed by combining the similar blocks and residual blocks corresponding to each of the blocks of the current frame.

When implementing encoding techniques, a buffer (e.g., a frame buffer) must be utilized for storing reference frames. FIG. 1 shows a schematic diagram of accessing a buffer 10 for video encoding in a prior art. To perform video encoding, two memory regions 12a and 12b in the buffer 10 are allocated to a reference frame. The luma component data of the reference frame are stored in the memory region 12a, and the other two chroma component data of the reference frame are stored in the memory region 12b. Referring to FIG. 1, the luma component data and the two chroma component data of the reference frame in a block (e.g., 16*16 macro blocks) are depicted. Under a 4:2:0 video encoding format, each block is associated with 16*16 luma component data Y, 8*8 chroma component data U, and 8*8 chroma component data V. Each luma component data Y includes 8 bits (one byte), and each of the chroma component data U and V also respectively include 8 bits (one byte). In the memory region 12a, the 16*16 luma component data Y of each block are stored in 16 adjacent bytes of 16 adjacent rows; in the memory region 12b, the 8*8 chroma component data U and the 8*8 chroma component data V of each block are stored in 8 adjacent rows, with each row being alternately storing the chroma component data V and the chroma component data U. That is to say, the chroma component data V and the chroma component data U are alternately stored as one column of chroma component data U followed by one column of chroma component data V, as shown in FIG. 1. To perform the luma motion estimation and the luma motion compensation, the prior art accesses (e.g., loads) the memory region 12a; to perform the chroma compensation, the prior art accesses the memory region 12b.

One of the shortcomings of the prior art is that a large bandwidth (i.e., a data amount within a time unit) of the buffer 10 is required. When performing video decoding, the prior art in FIG. 1 needs to access more data from the memory region 12a (e.g., compared to the data in the memory region 12b) to perform the luma motion estimation. Therefore, a quite large bandwidth is required for accessing the memory region 12a of the buffer 10 if completing the luma motion estimation within the same period of time is required. The requirement of a large bandwidth hinders implementation and promotion of video decoding techniques. In addition, for high-resolution images having an even greater number of blocks, the above shortcoming of the prior art is further emphasized.

SUMMARY OF THE INVENTION

The invention is directed to a method for video encoding for effectively reducing a bandwidth requirement of a buffer.

According to an object of the present invention, a method for video encoding according to one or more reference frames is provided. Each reference frame is associated with a plurality of first component data (e.g., luma component data), a plurality of second component data, and a plurality of third component data (e.g., chroma component data). The method comprises steps of: converting the reference frame by dividing the first component data into a plurality of primary data and a plurality of secondary data respectively stored in a first memory region and a secondary memory region of the buffer; accessing (e.g., loading) the first memory region to perform a motion estimation (e.g., a luma motion estimation) without accessing the second memory region; and accessing the second memory region to perform a first motion compensation (e.g., a luma motion compensation).

In one embodiment, the second component data and the third component data are stored in a third memory region of a buffer, and the third region is accessed to perform a second motion compensation (e.g., a chroma motion compensation). In an alternative embodiment, the second component data and the third component data as well as the secondary data are stored in the second memory region, such that the second motion compensation can be performed by accessing the second region. For example, the secondary data may be interlaced with the second component data and the third component data in the second memory region of the buffer.

In one embodiment, the step of converting the reference frame comprises: forming the primary data with a plurality of bits comprising a most significant bit (MSB) of a first number of the first component data, and forming the secondary data with a plurality of bits comprising a least significant bit (LSB) of a second number of the first component data.

In one embodiment, the step of converting the reference frame comprises: utilizing a first number of the first component data as the primary data, and utilizing a second number of the first component data as the secondary data. For example, 16*16 number of luma component data of a block of the reference frame may be divided into 16*8 number of primary data and 16*8 number of secondary data according to odd and even columns and rows. That is, according to whether a position of a pixel associated with the first component data satisfies a predetermined pattern (e.g., whether being located at an odd column or odd row), each of the first component data is selectively utilized as one of the primary data or one of the secondary data. Alternatively, according to whether a value of the first component data satisfies a statistical characteristic (e.g., whether being greater than a threshold), each of the first component data is selectively utilized as one primary data or one secondary data.

In one embodiment, each of the primary data comprises a plurality of bits of one of the first component data and a plurality of bits of another one of the first component data, and each of the secondary data comprises a plurality of bits of one of the first component data and a plurality of bits of another of the first component data.

For example, five MSBs are selected from every 8-bit luma component data of the even columns, and three MSBs are selected from every 8-bit luma component data of the adjacent odd column to form one 8-bit primary data. Accordingly, 16*16 number of luma component data of a 16*16-pixel block can form 16*8 number of primary data. Similarly, three LSBs are selected from every 8-bit luma component data of the even columns, and five LSBs are selected from every luma component data of the adjacent odd column to form one 8-bit secondary data. Accordingly, 16*16 number of luma component data of a 16*16-pixel block can form 16*8 number of secondary data. When selecting the first number of the first component data and the second number of the first component data, according to whether a positions of a pixel associated with the first component data satisfies a predetermined pattern, each of the first component data is selected as one of the first number of the first component data or as one of the second number of the first component data. Alternatively, according to whether a value of each of the first component data satisfies a statistical characteristic, the corresponding first component data is selected as one of the first number of the first component data or the second number of the first component data.

According to another object of the present invention, a video encoding apparatus is provided. The video encoding apparatus performing video encoding according to a reference frame comprises a reference frame converting module, a loader, a motion estimation module and a motion compensation module. The reference frame converting module performs a frame converting step of the present invention to divide a plurality of first component data of the reference frame into a plurality of primary data and a plurality of secondary data respectively stored in a first memory region and a second memory region of a buffer. In one embodiment, the reference frame converting module further stores a plurality of second component data and a plurality of third component data of the reference frame to a third memory region of the buffer. In another embodiment, the reference frame converting module stores the second component data and the third component data as well as the secondary data to the second memory region. The loader accesses the buffer. The motion estimation module performs a motion estimation (e.g., a luma motion estimation) according to data accessed by the loader from the first memory region. The motion compensation module performs a motion compensation (including a luma motion compensation and a chroma motion compensation) according to data accessed by the loader from the second memory region (and the third memory region).

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
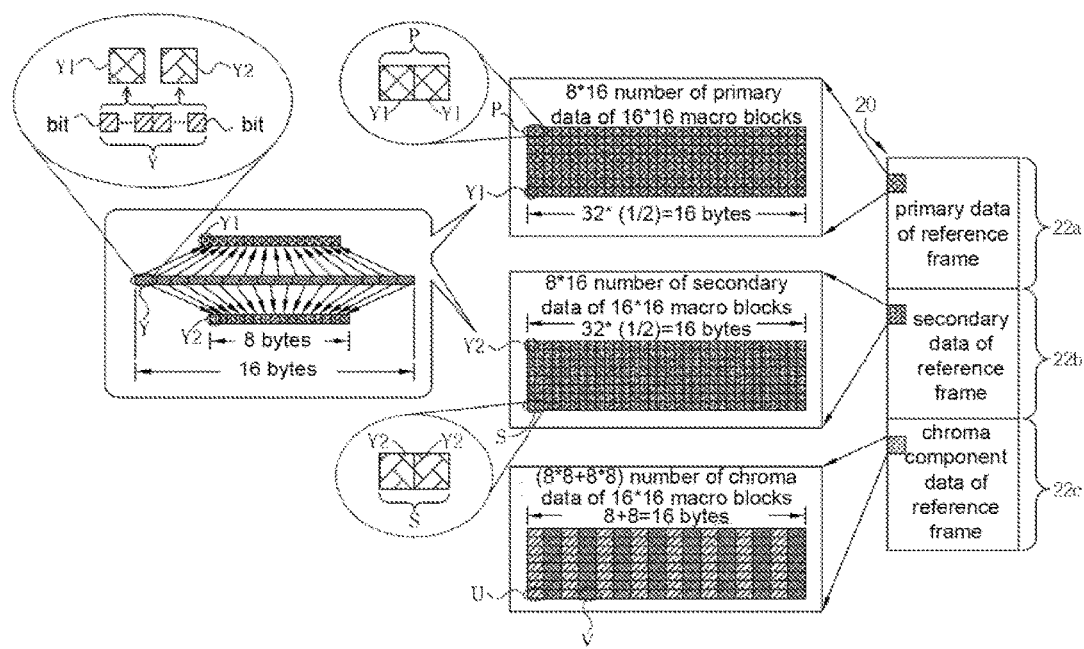
FIG. 2 is a schematic diagram of a configuration of a buffer for video encoding according to one embodiment of the present invention.

FIG. 2 shows a schematic diagram of storing a reference frame to a buffer 20 according to one embodiment of the present invention. To perform video encoding, the buffer 20 may allocate three memory regions 22*a*, 22*b*, and 22*c* to a reference frame. A plurality of luma component data Y of the reference frame are divided into a plurality primary data P and a plurality of secondary data S, which are respectively stored in the memory regions 22*a* and 22*b*. A plurality of chroma component data U and V of the reference frame are stored in the memory region 22*c*. For example, each 8-bit luma component data Y may be divided into two sub-component data Y1 and Y2 according to a bit sequence—four most significant bits (MSB) are the sub-component data Y1, and four least significant bits (LSB) are the sub-component data Y2. Every two 4-bit sub-component data Y1 can be merged to form a unit of 8-bit primary data P, and every two 4-bit sub-component data Y2 can be merged to form a unit of 8-bit secondary data S. The primary data P and the secondary data S can be respectively stored in the memory regions 22a and 22b. The units of primary data P are adjacently placed and stored in the memory region 22a, and the units of secondary data S are also adjacently placed and stored in the memory region 22b.

Taking a unit of blocks (e.g., 16*16 macro blocks) as an example, in a 4:2:0 video decoding format, each of the blocks associates with 16*16 number of luma component data Y, 8*8 number of chroma component data U, and 8*8 number of chroma component data V. Every 16*16 number of luma component data Y (each having 8 bits) can be divided into 16*16 sub-component data Y1 (each having 4 bits) and 16*16 sub-component data Y2 (4 bits). Every 16*16 sub-component data Y1 (4 bits) can be merged into 8*16 primary data P (8 bit) occupying 8*16 bytes in the memory region 22a. Similarly, every 16*16 sub-component Y2 (4 bits) can be merged into 8*16 secondary data S (8bit) occupying 8*16 bytes in the memory region 22b. Thus, with same-size (same-resolution) reference frames, the sizes of the memory regions 22a and 22b is respectively half of that of the memory region 12 in FIG. 1.

In the memory region 22c, 8*8 chroma component data U (8 bits) and 8*8 chroma component data V (8 bits) of each block can be stored in eight adjacent rows, with the rows alternately storing the chroma component data V and the chroma component data U. If multiple reference frames are needed for video encoding, another reference frame may be stored after the memory region 22c or before the memory region 22a.

Figure 3:
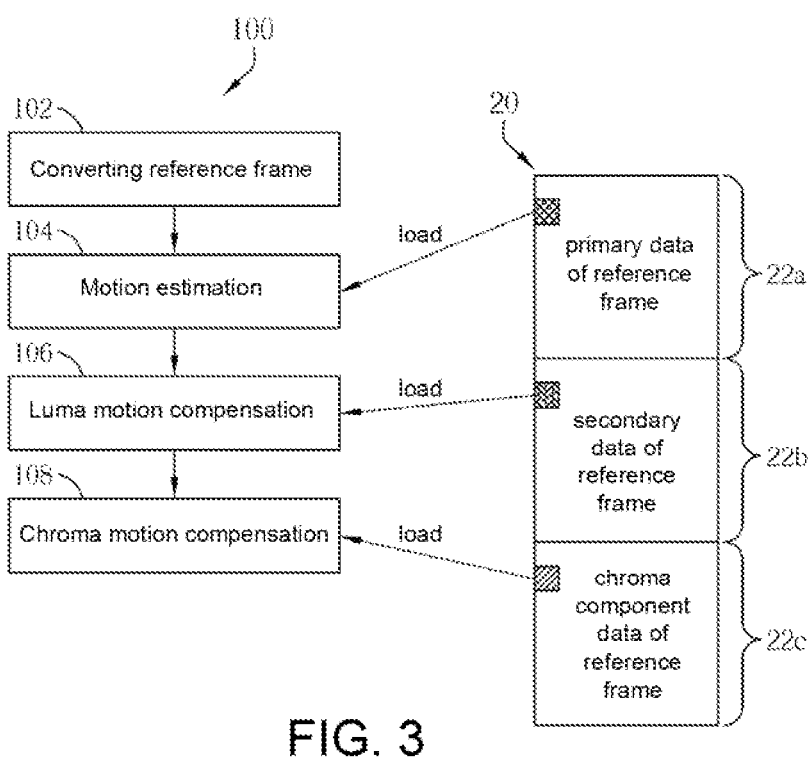
FIG. 3 is a process of video encoding performed based on the configuration in FIG. 2 according to one embodiment of the present invention.

FIG. 3 shows a schematic diagram of a process 100 according to an embodiment of the present invention. The process is for performing video encoding based on the allocation of the buffer 20 in FIG. 2, and may be performed for video encoding a current frame according to a reference frame. Steps of the process 100 are described below.

In Step 102, the reference frame is converted to divide a plurality of luma component data Y of the reference frame to a plurality units of primary data P and a plurality units of secondary data S, so that the primary data P and the secondary data S can be respectively stored in the memory regions 22a and 22b of the buffer 20. A plurality of chroma component data U and V of the reference frame are stored in the memory region 22c.

In Step 104, only the memory region 22a, instead of both the memory regions 22a and 22b, is accessed (loaded) to perform a luma motion estimation according to the primary data P in the memory region 22a. For example, when video encoding a current block of a current frame, a corresponding search window of the reference frame is divided into a plurality of reference blocks, and the corresponding primary data P of the reference blocks are obtained by merely accessing the memory region 22a. Thus, differences between the current block and the reference blocks may be compared to obtain a motion vector. Related calculations and details for the motion vector are known to a person skilled in the art, and shall be omitted herein for the sake of brevity. In one embodiment, to compare the current block with the reference block, a 4-bit sub-component Y1 can be obtained from the primary data P of the reference block, and four MSBs of the 8-bit luma component data Y of the current block are compared with the 4-bit sub-component data Y1 of the reference block to obtain the corresponding motion vector. In one embodiment, to compare the current block with the reference block, 8-bit data can be calculated (e.g., interpolated) according to two adjacent 4-bit sub-component data Y1 of the reference block and compared with the 8-bit luma component data Y in the current block to obtain the corresponding motion vector.

In Step 104, a luma motion estimation may include an integer processing and a fine-tune processing. The integer processing is for acquiring an integral motion vector (in a unit of one pixel); the fine-tuning processing extends the accuracy of the integral motion vector to a level of fraction, e.g., in a unit of ½ or ¼ pixel. The luma motion estimation may also include the integer processing but not the subsequent fine-tuning processing. It should be noted that, regardless of the integer processing or fine-tuning processing, the process is performed according to the primary data P in the memory region 22a without accessing the secondary data S in the memory region 22b.

In Step 106, the memory region 22b is accessed (loaded) to perform a luma motion compensation according to the primary data P in the memory region 22a, the secondary data S in the memory region 22b, and the motion vector in Step 104, so as to provide corresponding luma similar data for each of the luma component data of each of the blocks in the current frame. The 8-bit luma component data Y of the reference frame can be combined from the primary data P in the memory region 22a and the secondary data S in the memory region 22b. To perform the luma motion compensation for a current block in the current frame, a plurality of 8-bit luma component data are obtained from the reference frame, according to the corresponding motion vector, to serve as the 8-bit luma similar data of the current block for approximating a plurality of original luma component data of the current block.

In Step 108, the memory region 22c is accessed (loaded) to perform a chroma motion compensation according to the chroma component data U/V in the memory region 22c and the motion vector in Step 104 to provide the corresponding chroma similar data for each chroma component data in each of the blocks in the current frame. To perform the chroma motion compensation for a current block in the current frame, a motion vector for the chroma motion compensation can be derived from the motion vector in Step 104, so as to accordingly obtain a plurality of chroma component data from the reference frame as chroma similar data of the current block to approximate the original chroma component data of the current block. By integrating the luma similar data in Step 106 and the chroma similar data in Step 108, a corresponding similar block can be obtained for the current block. A residual block is then obtained by subtracting the similar block from the current block, and the residual block is further compressed. The motion vector in Step 104 and the compressed residual block constitute a video encoded result of the current block.

Figure 1:
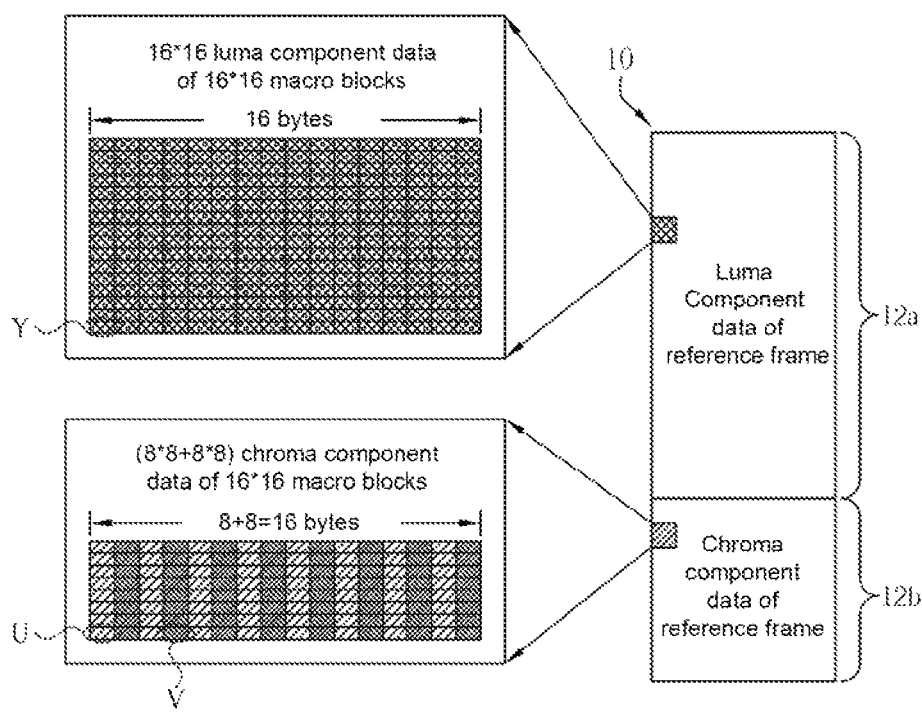
FIG. 1 is a schematic diagram of a configuration of a buffer for video encoding in the prior art.

When performing the luma motion estimation, the complete 8-bit luma component data Y of the reference frame needs to be accessed by the prior art in FIG. 1. In contrast, the process 100 of the present invention in FIG. 3 only accesses the 4-bit sub-component data Y1 of the reference frame through the primary data P, so that the process 100 of the present invention is capable of effectively reducing the data amount to be accessed from the buffer to decrease the required access bandwidth of the buffer. When performing the luma motion compensation for a current block in Step 106, the process 100 accesses the other 4-bit sub-component data Y2 of the reference frame. However, since the motion vector is already confirmed in Step 104, instead of accessing all of the sub-component data Y2, the process 100 is required to only access a needed part rather than all of the sub-component data Y2. Consequently, a total number of buffer accessed times in the process 100 is also reduced.

For example, when video encoding a 1080p high-resolution image having a frame rate of 30 frames per second, assuming that the search window utilized in the luma motion estimation covers 17*17 number of 16*16-pixel macro blocks, since each block in the search window contains 256 number of 8-bit (one byte) luma component data Y, the prior art needs to utilize 73984 (1717*256) bytes for performing the luma motion estimation for a current block. In addition, the required bandwidth in the prior art for loading from the buffer to the search window is 1065 Mbps.

In contrast, when the process 100 of the present invention performs the luma motion estimation for a current block in Step 104, since each of the sub-component data Y1 is only one-half of a byte (four bits), Step 104 only needs to utilize 36992 (17*17*256*0.5) bytes for loading the search window, demanding only a reduced buffer bandwidth of 532 Mbps—both of the above values are merely one-half of those of the prior art. When the process 100 performs the luma motion compensation for a current block in Step 106, rather than accessing all the sub-component data Y2 of the entire search window, the process 100 only accesses the sub-component data Y2 in the memory region 22b, and so the required bandwidth is approximately reduced to 125 Mbps. The total bandwidth requirement added up from the required bandwidths in Steps 104 and 106 is still far less than the bandwidth requirement of the prior art in FIG. 1. The required bandwidth in Step 108 is the same as that of the prior art. Due to a smaller percentage of the chroma component data in the search window, the overall bandwidth requirement of the video encoding is dominated by the bandwidth requirement for the luma motion estimation—the present invention is targeted as improving the luma motion estimation to effectively reduce the bandwidth requirement.

The embodiment illustrated in FIG. 2 divides the luma component data Y into the primary data P and the secondary data S according to a principle of truncation, so as to reduce the bandwidth requirement for the luma motion estimation when converting the reference frame. In an alternative embodiment of the present invention, the plurality of luma component data Y may also be divided into a plurality of primary data P and a plurality of secondary data S according to a principle of sub-sampling. More specifically, in the alternative embodiment, according to a predetermined sub-sampling rule, a first number of the luma component data Y are selected from all the luma component data Y of the reference frame as the first number of primary data P, and a second number of the luma component data Y are selected as the second number of secondary data S. The first number and the second number are smaller than a total number of the luma component data in the reference frame.

Figure 4:
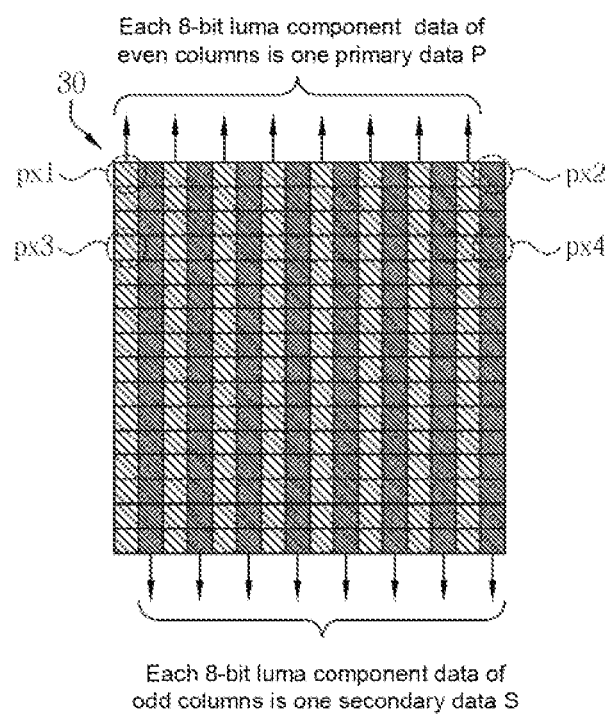
FIG. 4 and FIG. 5 are schematic diagrams of dividing different luma component data into primary data or secondary data according to embodiments of the present invention.
Figure 5:
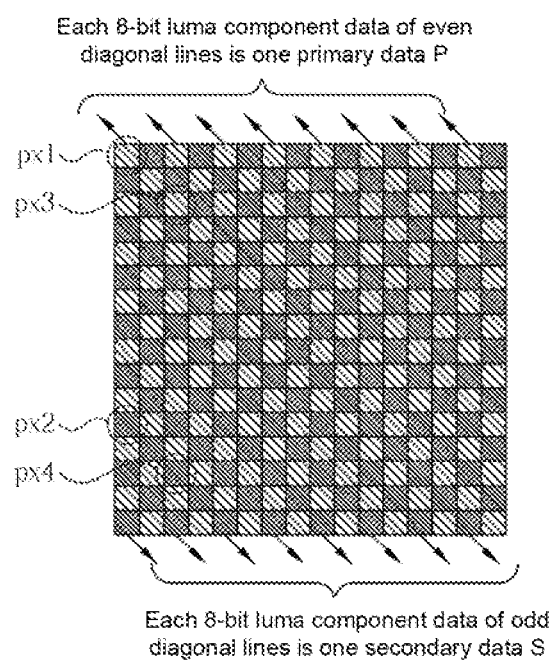

For example, according to whether a position of a pixel associated with each of the luma component data Y satisfies a predetermined pattern (e.g., whether being located at an odd column or an odd row), each of the luma component data Y in the reference frame is selected as one primary data P or one secondary data S. FIGS. 4 and 5 are schematic diagrams of dividing a plurality of luma component data Y to the primary data P and the secondary data S according to different embodiments of the present invention.

In the reference frame, each of the luma component data Y is selected as one primary data P or one secondary data S according to a pixel column sequence or a row sequence thereof. As shown in FIG. 4, in a block 30 of the reference frame, a particular luma component data Y is selected as one primary data P to be stored in the memory region 22a (in FIG. 3) when the pixel corresponding to the particular luma component data Y is located at an even row (e.g., a pixel px1 or px3); another particular luma component data Y is selected as one secondary data S to be stored in another memory region 22b when the pixel corresponding to the luma component data Y is located at an odd row (e.g., a pixel px2 or px4). Thus, in the 16*16-pixel block 30, 16*16 number of luma component data Y are divided into 8*16 number of primary data P and 8*16 number of secondary data S to accordingly reduce the bandwidth requirement for the luma motion estimation.

Referring to FIG. 5 showing another embodiment, in a block 30 of the reference frame, a particular luma component data Y is selected as one primary data P to be stored in the memory region 22a (in FIG. 3) when the pixel corresponding to the particular luma component data Y is located at an even diagonal line (e.g., a pixel px1 or px3); another particular luma component data Y is selected as one secondary data S to be stored in another memory region 22b when the pixel corresponding to the luma component data Y is located at an odd diagonal line (e.g., a pixel px2 or px4), and is stored in another memory region 22b. Thus, in the 16*16-pixel block 30, 16*16 number of luma component data Y are divided into 8*16 number of primary data P and 8*16 number of secondary data S to accordingly reduce the bandwidth requirement for the luma motion estimation.

In other embodiments of the present invention, each of the luma component data Y can be selected as one primary data P or one secondary data S according to whether a value of that luma component data Y satisfies a statistical characteristic. For example, an average luma value is calculated according to all the luma component data of the reference frame, and a threshold is set according to the average luma value. Each of the luma component data Y is selected as one primary data P or one secondary data S according to whether the value of the luma component data Y is greater than the threshold.

When dividing the plurality of luma component data Y into the plurality of primary data P and the plurality of secondary data S in the process of converting the reference frame, the principles of truncation and sub-sampling can be independently or jointly employed. In one embodiment (not shown), according to a predetermined sub-sampling rule, a first number of luma component data Y and a second number of luma component data Y are selected from all the luma component data Y of the reference frame. From each of the first number of luma component data Y, a third number of bits and a fifth number of bits are respectively selected as a sub-component data Ys1 and a sub-component data Ys3. From each of the second number of luma component data Y, a fourth number of bits and a sixth number of bits are respectively selected as a sub-component data Ys2 and a sub-component data Ys4. One sub-component data Ys1 and one sub-component data Ys2 are combined into one primary data P, and one sub-component data Ys3 and one sub-component data Ys3 are combined into one secondary data S.

In one embodiment, in the reference frame, five MSBs are selected from each 8-bit luma component data Y of the even columns as a sub-component data Ys1, and three MSBs are selected from each 8-bit luma component data Y of the odd columns as a sub-component data Ys2. An 8-bit primary data P is formed by combining the sub-component data Ys1 and Ys2. Thus, 8*16 number of primary data P can be formed from 16*16 number of luma component data Y in a 16*16-pixel block. Similarly, three LSBs are selected from each 8-bit luma component data Y of the even columns as a sub-component data Ys3, and five LSBs are selected from each 8-bit luma component data Y of the adjacent odd columns as a sub-component data Ys4. An 8-bit secondary data S is formed by combining the sub-component data Ys3 and Ys4. Thus, 8*16 secondary data S can be formed from 16*16 number of luma component data Y in a 16*16-pixel block. Thus, when performing the luma motion estimation according to the primary data P, the bandwidth requirement for the luma motion estimation can be reduced.

Figure 6:
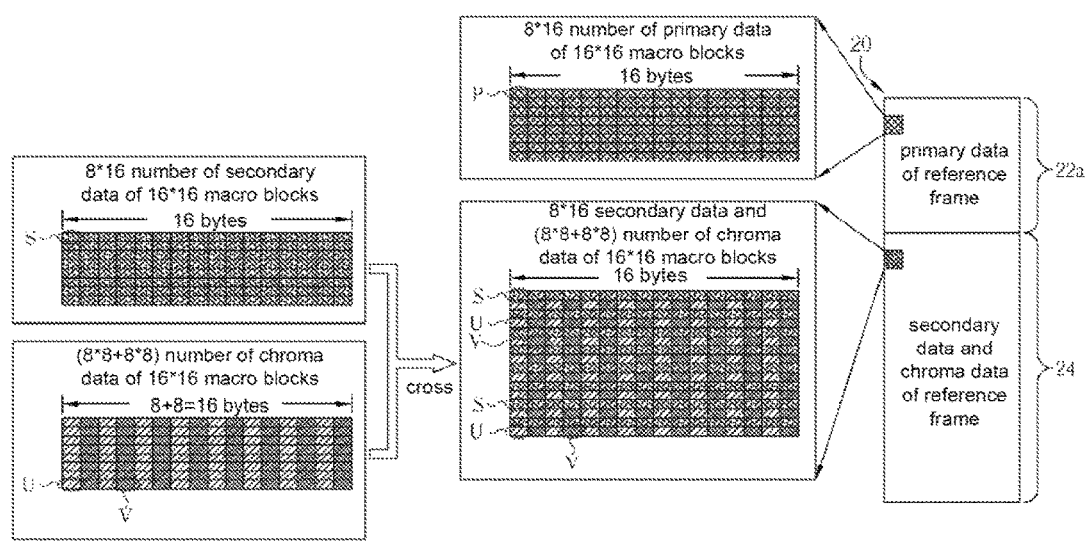
FIG. 6 is a schematic diagram of a configuration of a buffer for video encoding according to one embodiment of the present invention.
Figure 7:
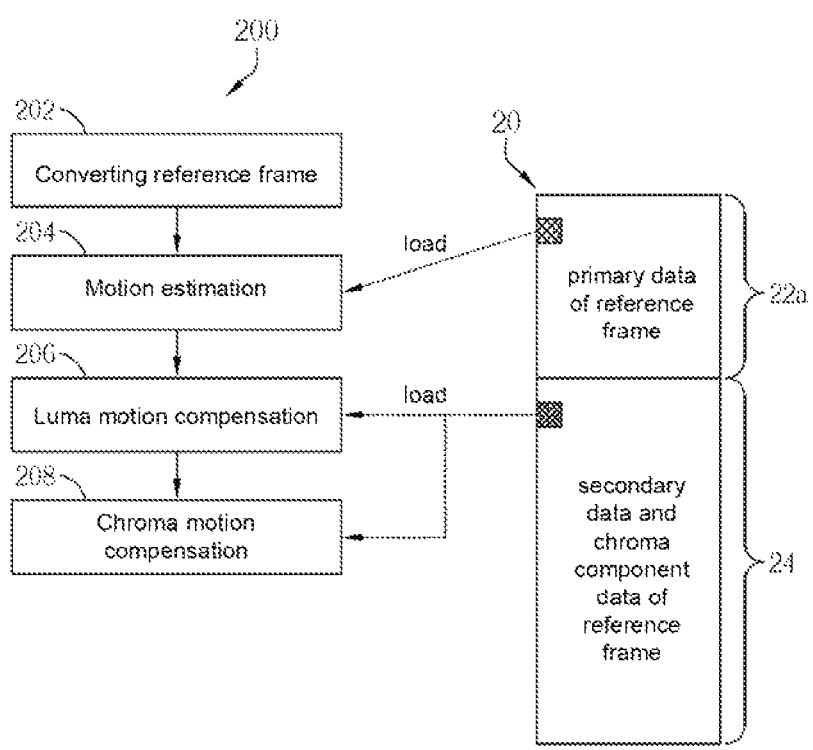
FIG. 7 is a process of video encoding performed based on the configuration in FIG. 6 according to one embodiment of the present invention.

FIG. 6 shows a schematic diagram of a configuration of storing a reference frame to a buffer 20 according to one embodiment of the present invention. FIG. 7 shows a process 200 that performs video encoding based on the configuration in FIG. 6 according to one embodiment of the present invention. To perform the video encoding, the buffer 20 assigns two memory regions 22a and 24 for a reference frame. A plurality of luma component data Y of the reference frame are divided into a plurality of primary data P and a plurality of secondary data S. The primary data P are stored in the memory region 22a; the secondary data S as well as a plurality of chroma component data U and V of the reference frame are stored in the memory region 24.

For example, in the reference frame, in a unit of a block (e.g., a 16*16 macro block), under a 4:2:0 video encoding format, each block is associated with 16*16 number of luma component data Y, 8*8 number of chroma component data U and 8*8 number of chroma component data V. Assuming that the 16*16 number of luma component data Y can form 8*16 number of primary data P and 8*16 number of secondary data S, the secondary data S in an interlaced form can be stored with the chroma component data U and V in the memory region 24 of the buffer 20, as shown in FIG. 6. In the embodiment of FIG. 6, the secondary data S and the chroma component data U/V are alternately (odd-even) stored in adjacent rows of the memory region 24, and the chroma component data U and V are alternatively stored along a same row in a unit of a column. When multiple reference frames are required for the video encoding, another reference frame may be stored after the memory region 24 or before the memory region 22a.

As shown in FIG. 7, process 200 is performed for video encoding a current frame based on the configuration in FIG. 6. Steps of the process 200 are described below.

In Step 202, the reference frame is converted to divide a plurality of luma component data Y of the reference frame to a plurality of primary data P and a plurality of secondary data S, so that the primary data P are stored in the memory region 22a of the buffer 20, and the secondary data S as well as the chroma component data U and V are stored in the memory region 24. Details of Step 204 can be referred from descriptions of Step 104 in FIG. 3. Similar to Step 104, Step 204 may also include integer processing and fine-tuning processing.

In Step 206, the memory region 24 is accessed (loaded) to perform a luma motion compensation according to the primary data P in the memory region 22a, the secondary data S in the memory region 24 and the motion vector in Step 104 to provide a luma similar data for each of the luma component data Y of each of the blocks in the current frame. The 8-bit luma component data Y of the reference frame can be combined from the primary data P in the memory region 22a and the secondary data S in the memory region 24. To perform the luma motion compensation for a current block of the current frame, a plurality of 8-bit luma component data Y are obtained from the reference frame, according to the corresponding motion vector, to serve as the 8-bit luma similar data of the current block for approximating a plurality of original luma component data Y of the current block.

In Step 208, the chroma motion compensation is performed according to the access to the memory region and the motion vector in Step 104 to provide the corresponding chroma similar data for the chroma component data in each of the blocks in the current frame. Details of Step 208 can be referred from the descriptions of Step 108 in FIG. 3. By integrating the luma similar data in Step 206 and the chroma similar data in Step 208, a corresponding similar block can be obtained for the current block. A residual block is then obtained by subtracting the similar block from the current block, and residual block is further compressed. The motion vector in Step 204 and the compressed residual block represent a video encoded result of the current block.

Not only the process 200 inherits advantages of the process 100, but also the configuration of the memory 24 is capable of further optimizing video encoding performance when performing Steps 206 and 208. Since the secondary data S and the chroma component data U/V are adjacently stored, the process 200 does not need to cross different memory regions when accessing the secondary data S and the corresponding chroma component data U/V, thereby reducing cross page penalty of the buffer.

For example, in one embodiment, each 8-bit secondary data S is combined from four LSBs of two luma component data, such that two secondary data S associate with four luma component data Y. According to the alternating arrangement in the embodiment shown in FIG. 6, two secondary data S of a same row correspond to one chroma component data U and one chroma component data V of an adjacent row. When performing Steps 206 and 208, being arranged closely, the two secondary data S are together accessed with the corresponding chroma component data U and V in the adjacent row. It should be noted that the two secondary data S and the corresponding chroma component data U and V accessed together exactly match the data requirement of the 4:2:0 format. In the 4:2:0 format, data processing is performed in a unit of 2*2 luma component data Y as well as the corresponding one chroma component data U and one chroma component data V at the same row. By simultaneously loading two secondary data S, one chroma component data U and one chroma component data V that cooperate with the primary data P in Step 204, exactly four luma component data Y, one chroma component data U and one chroma component data V are obtained, such that Steps 206 and 208 can be performed with better efficiency.

Figure 8:
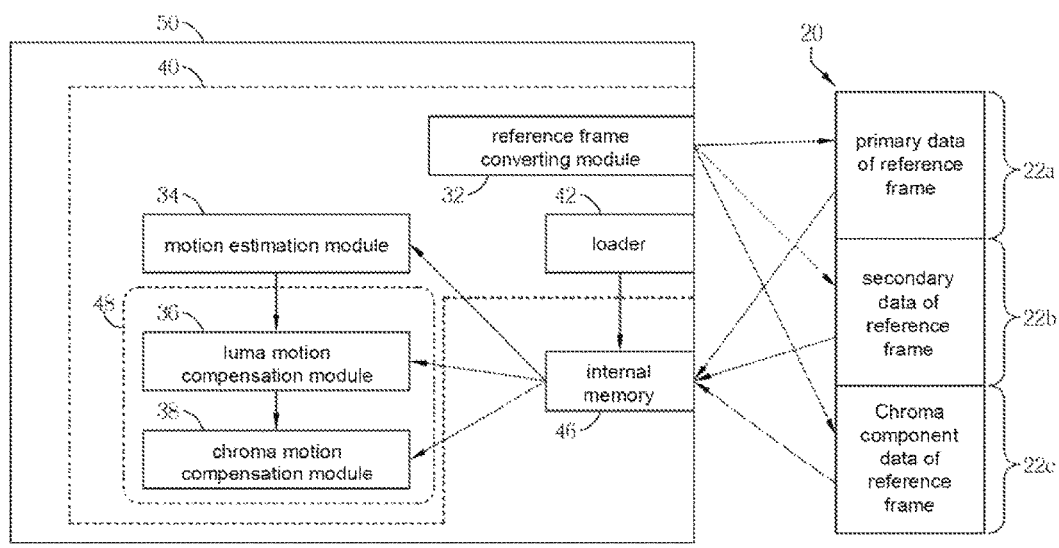
FIG. 8 is a schematic diagram of a video encoder according to one embodiment of the present invention.

FIG. 8 shows a schematic diagram of a video encoder 40 according to one embodiment of the present invention. For example, the video encoder 40 is built-in a processor 50 to implement the video decoding technique of the present invention, e.g., the process 100 in FIG. 3 and/or the process 200 in FIG. 7. The processor 50 may be a signal processing chip or a baseband processing chip in a mobile phone, and comprises an embedded internal memory 46, e.g., a static random access memory (SRAM). The processor 50 is coupled to an externally connected buffer, e.g., a dynamic random access memory (DRAM).

The video encoder 40 is a video encoding apparatus that performs video encoding according to a reference frame. The video encoder 40 comprises a reference frame converting module 32, a loader 42, a motion estimation module 34, and a motion compensation module 48. After the video encoder 40 obtains the reference frame, the reference frame converting module 32 divides a plurality of luma component data Y of the reference frame into a plurality of primary data P and a plurality of secondary data S, so that the primary data P and the secondary data S are respectively stored to a memory region 22a and a memory region 22b of a buffer 20. Chroma component data U and V of the reference frame are stored to a memory region 22c. The loader 42, coupled to an internal memory 46, accesses the buffer 20 to load data stored in the buffer 20 to the internal memory 46. The motion estimation module 34 performs a luma motion estimation according to the loader 20 accessing the memory region 22a. The motion compensation module 48 comprises a luma motion compensation module 36 and a chroma compensation module 38 for respectively performing a luma motion compensation and a chroma motion compensation according to the loader 42 accessing the memory regions 22b and 22c. Operation details of the reference frame converting module 32, the motion estimation module 34, the luma motion compensation module 36 and the chroma motion compensation module 38 can be referred from related descriptions of Steps 102, 104, 106, and 108.

The video encoder 40 may also implement the process 200 in FIG. 7 with the configuration in FIG. 6. The reference frame converting module 32 stores the secondary data S together with the chroma component data U and V in the memory region 24 of the buffer 20, as shown in FIG. 6. The luma motion compensation module 36 and the chroma motion compensation module 38 in the motion compensation module 48 respectively perform a luma motion compensation and a chroma motion compensation according to the loader 42 accessing the memory region 24. The modules of the video encoder 40 may be implemented by software, hardware, and/or firmware.

In conclusion, compared to the prior art, the present invention is capable of decreasing a data amount required for the luma motion estimation, so that internal memory resources consumed by video encoding can be effectively shrunk while also reducing the buffer access bandwidth requirement for video encoding, thereby optimizing overall performance and lowering costs of video encoding.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for video encoding data applied to a video encoding apparatus, the method comprising:
    dividing a luma component datum of a pixel into a primary datum and a secondary for motion estimation and motion compensation, wherein the primary datum consists of one or more most significant bits of the luma component datum, and the secondary datum consists of the remaining hits of the luma component datum;
    storing the primary datum in a first memory region of a buffer externally connected to the video encoding apparatus;
    storing the secondary datum in a second memory region of the buffer distinct from said first memory region;
    accessing, by a loader, only the first memory region in a first time period to perform, by a motion estimation module, a luma motion estimation with the primary datum before accessing the second memory region; and
    accessing, by the loader, only the second memory region in a second time period after the first time period to perform, by a motion compensation module, a luma motion compensation with the primary datum and the secondary datum;
    wherein the loader accesses the first memory region and the second memory region to load the primary datum and the secondary datum to an embedded internal memory for use by the motion estimation module and the motion compensation module;
    wherein said loader loads the primary datum to the embedded internal memory and said motion estimation module performs the luma motion estimation prior to said loader accessing the second memory region and said motion compensation module performing the motion compensation.

2. The method according to claim 1, wherein said pixel further comprises a first chroma component datum and a second chroma component datum, the method further comprising:
    storing the first chroma component datum and the second chroma component datum to a third memory region; and
    accessing the third memory region to perform a chroma motion compensation.

3. The method according to claim 1, wherein said pixel further comprises a first chroma component datum and a second chroma component datum, the method further comprising:
    storing the first chroma component datum and the second chroma component datum to the second memory region; and
    performing a chroma motion compensation according to data accessed from the second memory region.

4. The method according to claim 3, wherein the secondary datum is interlaced with the first chroma component datum and the second chroma component datum in the second memory region.

5. A video encoding apparatus comprising:
    a reference frame converting module, for converting a reference frame by dividing a luma component datum of each pixel of the reference frame into a primary datum and a secondary datum, storing said primary datum in a first memory region of a buffer, and storing said secondary datum in a second memory region of the buffer, wherein the primary datum consists of one or more most significant bits of the luma component datum, and the secondary datum consists of the remaining bits of the luma component datum;
    a loader, for accessing the buffer;
    a motion estimation module, directing the loader in a first time period to access a plurality of primary data comprising said primary datum only from the first memory region and performing a luma motion estimation according to said plurality of primary data without said loader accessing the second memory region;
    a motion compensation module, directing the loader in a second time period after the first time period to access a plurality of secondary data comprising said secondary datum only from the second memory region and performing a motion compensation according to said plurality of primary data and said plurality of secondary data without said loader further accessing the first memory region;

wherein the luma component datum is divided into the primary datum and the secondary datum for the luma motion estimation; and further comprising an embedded internal memory, wherein the buffer is externally connected to the video encoding apparatus and the loader accesses the first memory region and the second memory region to load the plurality of primary data and the plurality of secondary data to the embedded internal memory for use by the motion estimation module and the motion compensation module;

wherein said loader loads the plurality of primary data to the embedded internal memory and said motion estimation module performs the luma motion estimation prior to said loader accessing the second memory region and said motion compensation module performing the motion compensation.

6. The apparatus according to claim 5, wherein each pixel further comprises a first chroma component datum and a second chroma component datum, the reference frame converting module further stores the first chroma component datum and the second chroma component datum to a third memory region, and the motion compensation module performs the motion compensation according to data accessed by the loader from the second memory region and the third memory region.

7. The apparatus according to claim 5, wherein each pixel further comprises a first chroma component datum and a second chroma component datum, and the reference frame converting module stores the secondary datum, the first chroma component datum and the second chroma component datum to the second memory region of the buffer.

8. The apparatus according to claim 7, wherein the reference frame converting unit stores the secondary datum interlaced with the first chroma component data and the second chroma component data in the second memory region of the buffer.

9. The method according to claim 1, wherein the luma motion estimation includes an integer processing and a fine-tune processing, the integer processing acquires an integral motion vector, the fine-tuning processing acquires a fraction motion vector, the integral motion vector and the fraction motion vector forms a motion vector.

10. The method according to claim 1, wherein accessing the first memory region to perform the luma motion estimation further includes calculating an interpolated luma component according to two adjacent corresponding primary data, and performing the luma motion estimation according to the interpolated luma component.

11. The method according to claim 1, wherein the primary datum consists of the four most significant bits of the luma component datum.

12. The method according to claim 5, wherein the primary datum consists of the four most significant bits of the luma component datum.

13. The method according to claim 1, wherein the first memory region comprises a plurality of primary datum elements and the second memory region comprises a plurality of secondary datum elements, each primary datum element comprising one or more most significant bits of a luma component datum element for a corresponding pixel and each secondary datum element comprising the remaining bits of the luma component datum for the corresponding pixel.

14. The method according to claim 2, wherein accessing the third memory region occurs in a third time period after the first time period and the second time period.

15. The apparatus according to claim 5, wherein said loader loads the plurality of primary data to the embedded internal memory during the first time period and loads the plurality of secondary data to the embedded internal memory during the second time period.

16. The apparatus according to claim 6, wherein the third memory region is accessed in a third time period after the second time period.

* * * * *